United States Patent [19]

Tomlinson

[11] 4,270,420
[45] Jun. 2, 1981

[54] MULTI-SPINDLE LATHES

[75] Inventor: Geoffrey E. S. Tomlinson, Solihull, England

[73] Assignee: White-BSA Tools Ltd., Birmingham, England

[21] Appl. No.: 41,541

[22] Filed: May 22, 1979

[30] Foreign Application Priority Data

May 24, 1978 [GB] United Kingdom .............. 22134/78

[51] Int. Cl.³ ..................... B23B 3/34; B23B 19/02
[52] U.S. Cl. ................................. 82/3; 82/29 R
[58] Field of Search ................. 82/3, 24, 25, 28 R, 82/28 A, 28 B, 29 R, 29 A

[56] References Cited

U.S. PATENT DOCUMENTS

| 1,848,392 | 3/1932 | Sparks | 82/29 |
|---|---|---|---|
| 3,747,444 | 7/1973 | Schubert | 82/3 |

FOREIGN PATENT DOCUMENTS

| 563827 | 9/1972 | Switzerland | 82/3 |
|---|---|---|---|
| 997533 | 7/1965 | United Kingdom | 82/3 |

*Primary Examiner*—Harrison L. Hinson

[57] ABSTRACT

A multi-spindle machine tool has a frame, a work spindle carrier and its rotatable work spindles indexably mounted on the frame, and a main drive shaft arranged to drive the work spindles. A tool slide is mounted on the frame for movement towards and away from the spindle carrier, and movement of the slide and indexing of the carrier are controlled by a cam shaft. A drive input shaft transmits drive through a gear train from the drive input shaft to the main drive shaft and the or each cam shaft, the gear train being mounted in a readily accessible position on the frame so that gears thereof can be readily changed, and the or each cam shaft being arranged at a side of the frame so that said cams are readily accessible for changing.

12 Claims, 1 Drawing Figure

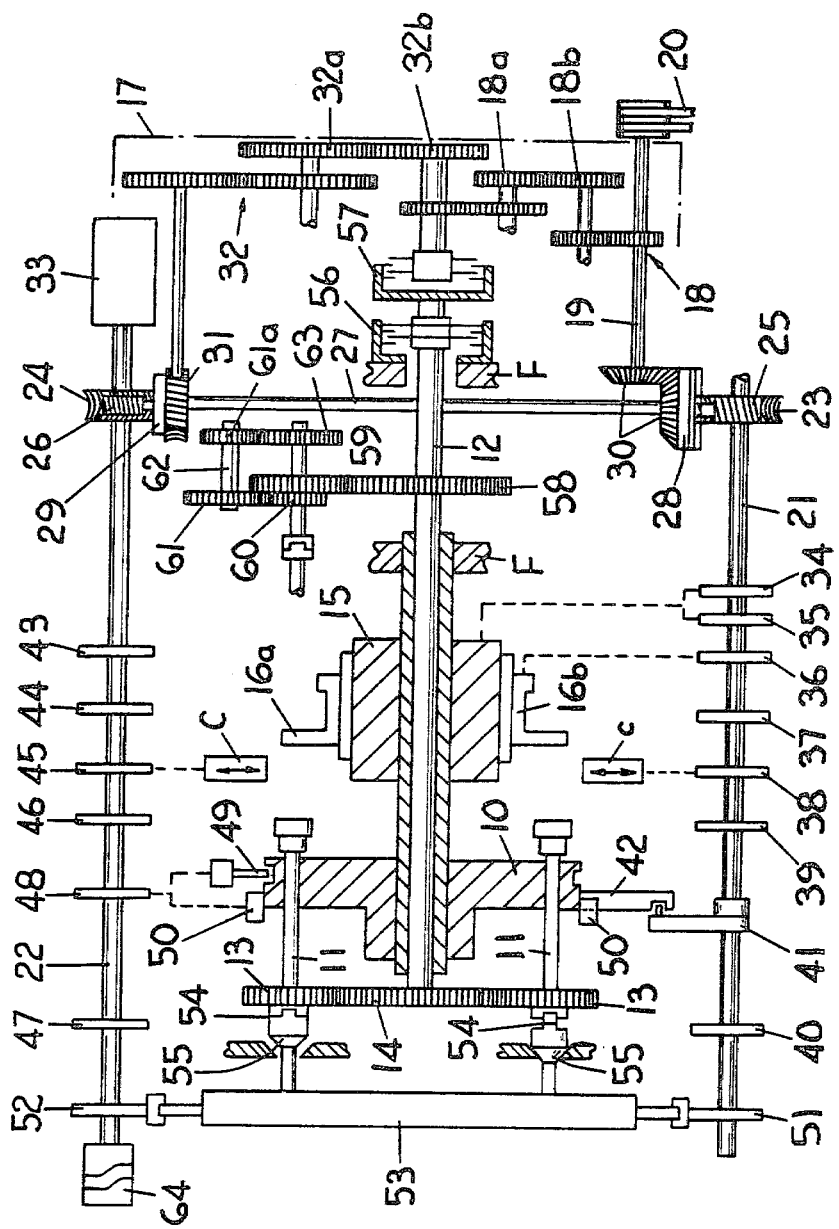

MULTI-SPINDLE LATHES

This invention relates to a multi-spindle machine tool and has as an object to provide such a machine in a convenient form.

A multi-spindle machine tool in accordance with the invention comprises a frame, a spindle carrier indexably mounted on the frame, a plurality of work spindles rotatably carried by the carrier, a main drive shaft arranged to drive the work spindles, a tool slide mounted on the frame for movement towards and away from the spindle carrier, at least one cam shaft having cams thereon which are arranged to control movement of the tool slide and indexing of the spindle carrier, a drive input shaft, and a gear train through which a drive is transmitted from the drive input shaft to the main drive shaft and the or each cam shaft, the gear train being mounted in a readily accessible position on the frame so that gears thereof can be readily changed, and the or each cam shaft being arranged at a side of the frame so that said cams are readily accessible for changing.

The accompanying drawing shows the layout of an example of a multi-spindle machine tool in accordance with the invention in a diagrammatic form.

The illustrated machine tool, which is in the form of a multi-spindle lathe, is of a conventional layout and comprises a main frame F (only parts of which are shown) on which a spindle carrier 10 is indexably mounted. This carrier 10 supports a plurality of equispaced work spindles 11 arranged in spaced parallel relationship. A main drive shaft 12 extends along the axis of the carrier 10 and is connected to all the spindles 11 by gears 13 on the spindles arranged around a gear 14 on the drive shaft 12.

Also mounted on the frame F is a main tool slide 15 which has an axial bore through which the shaft 12 extends. This slide 15 is movable axially of the carrier 10 and is provided with ways for the mounting of fixed tool holders (such as is shown at 16a) or independently axially slidable tool holders (such as is shown at 16b). Provision is made for up to four independent tool holders 16b to be mounted on the tool slide 15. The tool slide 15 is preferably of the type disclosed in our corresponding U.S. Application Ser. No. 41,482 filed simultaneously herewith.

One end of the frame has a removable cover 17 behind which there is a readily accessible first section 18 of a gear train connecting a drive input shaft 19 to the main drive shaft 12. Various ones of the gears of the gear train 18, for example a pair of gears 18a and 18b, can be removed and interchanged or replaced by another pair of gears having a different gear ratio to vary the speed of shaft 12 relative to shaft 19. The shaft 19 is driven by an electric motor (not shown), for example through the intermediary of a multi-belt drive 20.

The various functions of the lathe are controlled by a pair of spaced parallel cam shafts 21 and 22 rotatably mounted adjacent the sides of the frame F so that cams thereon are readily accessible for changing through removable panels on the frame. The cam shafts 21 and 22 have wormwheels 23 and 24 respectively thereon which are engaged by respective worms 25 and 26 on a cross-shaft 27 rotatably mounted on the frame. This cross-shaft 27 has two clutches 28 and 29 thereon, the clutch 28 having its input connected by bevel gearing 30 directly to the input shaft 19. The input of the clutch 29 is connected by worm gearing 31 and a second section 32 of the aforesaid gear train to the spindle drive shaft 12. As in the case of the gear train section 18, the gear train section 32 is mounted at one end of the frame behind the end cover 17 and has readily removable gears, for example a pair of gears 32a and 32b, by means of which the ratio of the speed of the cam shafts 21 and 22 to that of the spindle drive shaft 12 can be changed. It will be appreciated that when the clutch 28 is engaged, the cam shafts 21 and 22 will be rotated relatively rapidly as is required over a part of the machine cycle in which tool on the tool holders 16a and 16b are withdrawing from the workpieces on the carrier 10, and in the rapid approach portion of the feed stroke. The clutch 29 is engaged to give a much slower controlled feed motion. The clutches 28 and 29 may be hydraulically or electromagnetically actuable under the control of an electrical sequence control 33 operable by one of the cam shafts, in this case the cam shaft 22.

Each cam shaft 21, 22 has a plurality of cams arranged thereon at spaced positions along its length. The arrangement of these cams is such that they can all be readily removed with the cam shaft stopped in a predetermined cam change position.

More particularly, the cams are all of the edge type and have associated followers. Each cam is made up of a portion fixed to the cam shaft and a further portion which is removable from the cam shaft, the fixed portion forming a part of the edge cam surface. When the cam shaft is stopped in the cam change position, the followers all engage the fixed portions of their respective cams so that the removable portions thereof can be removed, without the necessity of turning the cam shaft.

On the cam shaft 21 there are two cams 34 and 35 which are arranged to control axial displacement of the tool slide 15 by way of a mechanism which is not described since it forms no part of the present invention. Also on the cam shaft 21 are two cams 36 and 37 which are used to control axial displacement of two independent tool holders 16b by means of a mechanism which is not described since it again forms no part of the present invention.

The frame F has provision for mounting thereon up to six cross-slides C, three of which are controlled by cams 38, 39 and 40 on the cam shaft 21. Two of these cross-slides are normally used for heavy turning work and these are situated at a level below the axis of carrier 10 and at horizontally opposed positions.

The spindle carrier 10 is indexed by an escapement mechanism, which in the illustrated machine is a Geneva mechanism 42 including an indexing arm 41. The arm 41 is preferably mounted on the cam shaft 21 for axial displacement therealong, so that the arm 41 can be caused to miss the coacting part of the indexing mechanism 42 and therefore fail to index the carrier 10.

The cam shaft 22 carries two cams 43 and 44 which control the axial displacement of the two remaining independent tool holders 16b and three cams 45, 46 and 47 which control the other three cross-slides. In addition there is a cam 48 which is arranged to actuate a locating bolt 49 for locating the carrier 10 in each of a plurality of angular positions, and clamps 50 for clamping the carrier in its located position. The cam 48 is preferably axially movable like the arm 41 to prevent unclamping and un-locating of the carrier 10 when indexing is not required.

The two cam shafts 21 and 22 also carry a pair of cams 51 and 52 which co-operate to actuate a chuck release ring 53 which is mounted for rotation on an axis coincident with that of the carrier 10. Relative rotation between the ring 53 and the carrier 10 is arranged to open or close workpiece-gripping chucks (not shown) on the work spindles 11. The cams 51 and 52 are preferably arranged so that the ring 53 is held stationary during the initial part of each indexing movement of the carrier 10, whereby the chucks on one or more of the work spindles open, and is then rotated with the carrier 10 during the remainder of the indexing movement. The chucks are closed again by returning the ring 53 to its starting position while the carrier 10 is located by the locking bolt 49. One of the cams 51 and 52 is arranged to rotate the ring 53 in one direction, the other cam being arranged to rotate the ring in the reverse direction. In an alternative embodiment (not shown), the ring 53 is provided with a spring return and the cam which otherwise performs the return movement is dispensed with. The mechanism linking the cams 51 and 52 with the ring 53 is preferably of the type disclosed in our corresponding U.S. Application Ser. No. 41,519 filed simultaneously herewith.

For some operations it is required to arrest one of the work spindles 11 at a particular work station, and this is conventionally achieved by incorporating a brake and clutch for each spindle. The brake and clutch have to be capable of stopping and starting the spindle and are therefore likely to be bulky. In the lathe now described, each spindle 11 has a simple dog clutch 54 and a simple brake 55 and these are only actuated with all the spindles at rest. The shaft 12 is provided with a brake 56 and a clutch 57 of capacity sufficient to permit stopping and starting of all the spindles, and these can be housed in a part of the machine where, unlike in the region of the carrier 10, there is no shortage of space. This feature is described in detail in our corresponding U.S. Application Ser. No. 41,518 filed simultaneously herewith.

For some operations, e.g. tapping, it is required to drive a rotary tool on the tool slide 15, preferably by means of a drive disclosed in our corresponding U.S. Application Ser. No. 41,845 filed simultaneously herewith. Briefly, such a drive comprises a single fixed gear 58 on the main drive shaft 12 and separate pick-off drives arranged as required in a cluster around this gear 58. In the example actually shown in the drawing, an auxiliary drive shaft 59 for one of the tools has a freely rotatable pinion 60 thereon which meshes with the gear 58 and with a gear 61 on a lay shaft 62. A further gear 61a engages a gear 63 on the shaft 59, the gears 61a and 63 being readily accessible for changing the speed of the auxiliary drive shaft 59 relative to that of the main drive shaft 12. The auxiliary drive can be assembled off the lathe and merely bolted on to a station reserved for it when the lathe is being retooled for a new batch of workpieces.

The cam shaft 22 also has a drum or disc type cam 64 which operates a bar feed mechanism when the lathe is equipped for bar work, rather than for chucking work.

I claim:

1. A multi-spindle machine tool comprising a frame, a main drive shaft rotatably mounted on said frame, a spindle carrier mounted on said frame for indexing movement relative thereto, a plurality of work spindles rotatably carried by said spindle carrier and driven from said main drive shaft, a tool slide mounted on said frame for movement towards and away from said spindle carrier, and a plurality of rotatable cams driven from said main drive shaft and operatively coupled to said tool slide and said spindle carrier, all of said rotatable cams being mounted on at least one camshaft disposed along a side of said frame adjacent the exterior thereof so that all of said rotatable cams are readily accessible for changing.

2. The multi-spindle machine tool according to claim 1, wherein two camshafts are provided and are respectively disposed along opposite sides of said frame.

3. The multi-spindle machine tool according to claim 1 further comprising at least one tool holder mounted on said tool slide for movement towards and away from said spindle carrier independently of said tool slide, and at least one rotatable cam provided on said at least one camshaft for controlling movement of said at least one tool holder.

4. The multi-spindle machine tool according to claim 1 further comprising at least one cross-slide movably mounted on said frame, and at least one rotatable cam provided on said at least one camshaft for controlling movement of said at least one cross-slide.

5. The multi-spindle machine tool according to claim 1 further comprising workpiece-gripping means provided on each of said work spindles, and at least one rotatable cam provided on said at least one camshaft for controlling opening and closing of said workpiece-gripping means.

6. The multi-spindle machine tool according to claim 1 further comprising retaining means operable to retain said spindle carrier selectively in each of its indexed positions, and at least one cam provided on said at least one camshaft for controlling operation of said retaining means.

7. The multi-spindle machine tool according to claim 1 further comprising a gear train through which drive is transmitted from said main drive shaft to said work spindles and said at least one camshaft, said gear train being mounted in a readily accessible position on said frame so that gears thereof can be readily changed.

8. The multi-spindle machine tool according to claim 7, wherein said gear train comprises respective sections by means of which drive is transmitted from said main drive shaft to said work spindles, and a further section by means of which drive is transmitted from said main drive shaft to said at least one camshaft, each of said sections including a pair of gears which are readily accessible for changing.

9. A multi-spindle machine tool comprising a frame, a main drive shaft rotatably mounted on said frame, and a plurality of elements for machining a workpiece comprising at least a spindle carrier mounted on said frame for indexing movement relative thereto, a plurality of work spindles rotatably carried by said spindle carrier and driven from said main drive shaft, and a tool slide mounted on said frame for movement towards and away from said spindle carrier, and rotatable cam means associated with each of said elements for selectively controlling the operation thereof, all of said cams being mounted on at least one camshaft driven by said main drive shaft and disposed at a side of said frame adjacent the exterior thereof, so that all of said rotatable cams are readily accessible for changing.

10. The multi-spindle machine tool according to claim 9, wherein two cam shafts are provided and are arranged along opposite sides of said frame.

11. A multi-spindle machine tool comprising a frame, a main drive shaft rotatably mounted on said frame, a spindle carrier mounted on said frame for indexing movement relative thereto between a plurality of indexed positions, retaining means operable to retain said spindle carrier selectively in each of its said indexed positions, a plurality of work spindles rotatably carried by said spindle carrier and driven from said main drive shaft, each of the work spindles being provided with workpiece-gripping means thereon, a tool slide mounted on said frame for movement towards and away from said spindle carrier, at least one tool holder mounted on said tool slide for movement towards and away from said spindle carrier independently of said tool slide, at least one cross-slide movably mounted on said frame, and a plurality of rotatable cams driven from said main drive shaft and controlling indexing of said spindle carrier, operation of said retaining means, opening and closing of said workpiece-gripping means, movement of said tool slide, movement of said at least one tool holder and movement of said at least one cross-slide, all of said rotatable cams being mounted on at least one camshaft arranged at a side of said frame so that all of said rotatable cams are readily accessible for changing.

12. The multi-spindle machine tool according to claim 11, wherein two camshafts are provided and are arranged along opposite sides of said frame.

* * * * *